US012241261B2

(12) United States Patent
Baert et al.

(10) Patent No.: US 12,241,261 B2
(45) Date of Patent: *Mar. 4, 2025

(54) PANEL SUITABLE FOR ASSEMBLING A FLOOR COVERING

(71) Applicant: CHAMPION LINK INTERNATIONAL CORPORATION, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 404 days.

This patent is subject to a terminal disclaimer.

(21) Appl. No.: 17/421,879

(22) PCT Filed: Jan. 3, 2020

(86) PCT No.: PCT/EP2020/050085
§ 371 (c)(1),
(2) Date: Jul. 9, 2021

(87) PCT Pub. No.: WO2020/144112
PCT Pub. Date: Jul. 16, 2020

(65) Prior Publication Data
US 2022/0098880 A1 Mar. 31, 2022

(30) Foreign Application Priority Data
Jan. 10, 2019 (NL) ..................... 2022368

(51) Int. Cl.
| | | |
|---|---|---|
| *E04F 15/10* | (2006.01) | |
| *B32B 3/02* | (2006.01) | |
| *B32B 5/18* | (2006.01) | |
| *B32B 7/12* | (2006.01) | |
| *B32B 9/00* | (2006.01) | |
| *B32B 9/04* | (2006.01) | |
| *B32B 27/06* | (2006.01) | |
| *B32B 27/20* | (2006.01) | |
| *B32B 29/00* | (2006.01) | |
| *E04F 15/08* | (2006.01) | |

(52) U.S. Cl.
CPC .............. *E04F 15/107* (2013.01); *B32B 3/02* (2013.01); *B32B 5/18* (2013.01); *B32B 7/12* (2013.01); *B32B 9/002* (2013.01); *B32B 9/005* (2013.01); *B32B 9/046* (2013.01); *B32B 27/065* (2013.01); *B32B 27/20* (2013.01); *B32B 29/007* (2013.01); *E04F 15/087* (2013.01); *E04F 15/105* (2013.01); *B32B 2262/106* (2013.01); *B32B 2264/107* (2013.01); *B32B 2266/0228* (2013.01); *B32B 2266/0235* (2013.01); *B32B 2266/025* (2013.01); *B32B 2266/0278* (2013.01); *B32B 2307/54* (2013.01); *B32B 2307/546* (2013.01); *B32B 2307/72* (2013.01); *B32B 2307/732* (2013.01); *B32B 2419/04* (2013.01)

(58) Field of Classification Search
CPC ..... E04F 15/107; E04F 15/105; E04F 15/087; B32B 3/02; B32B 5/18; B32B 7/12; B32B 9/002; B32B 9/005; B32B 9/046; B32B 27/065; B32B 27/20; B32B 29/007; B32B 2262/108; B32B 2264/107; B32B 2266/0228; B32B 2266/0235; B32B 2266/025; B32B 2266/0278; B32B 2307/54; B32B 2307/546; B32B 2307/72; B32B 2307/732; B32B 2419/04
See application file for complete search history.

(56) References Cited

U.S. PATENT DOCUMENTS

| | | | |
|---|---|---|---|
| 9,771,726 B2 | 9/2017 | Edmonds et al. | |
| 11,603,667 B2 * | 3/2023 | Baert | B32B 27/32 |
| 2015/0375471 A1 * | 12/2015 | Song | E04F 13/0885 |
| | | | 156/304.3 |
| 2016/0083965 A1 | 3/2016 | Baert et al. | |

FOREIGN PATENT DOCUMENTS

| | | |
|---|---|---|
| CH | 436666 A | 10/1966 |
| CN | 102995877 A | 3/2013 |
| CN | 05936166 A | 9/2016 |

(Continued)

OTHER PUBLICATIONS

Translation of JP2010229788A (bib, description and claims). (Year: 2010).*
International Search Report and Written Opinion of the International Searching Authority for International Application No. PCT/EP2020/050085 mailed on Feb. 5, 2020.
Thomas Luc Martine Baert et al.; Flooring Panel; U.S. Appl. No. 17/380,581, filed Jul. 20, 2021.
Thomas Luc Martine Baert et al.; Flooring Panel; U.S. Appl. No. 17/804,425, filed May 27, 2022.

*Primary Examiner* — Catherine A. Simone
(74) *Attorney, Agent, or Firm* — Heslin Rothenberg Farley & Mesiti P.C.

(57) ABSTRACT

Panel suitable for assembling a floor covering by gluing a plurality of said panels onto a substrate, wherein the panel has a substantially planar top side, and a substantially planar bottom side, at least four substantially linear side edges comprising at least one pair of opposite side edges, the panel having a layered structure which comprises a decorative top layer, wherein the decorative top layer shows a dimensional sensitivity to temperature and/or humidity fluctuations, the panel further comprising a reinforcing layer, adhered to the top layer, and having a modulus of elasticity of at least 2 Mpa.

12 Claims, No Drawings

(56) References Cited

FOREIGN PATENT DOCUMENTS

| | | | |
|---|---|---|---|
| CN | 207260506 U | | 4/2018 |
| CN | 109154157 A | | 1/2019 |
| JP | 2010229788 A | * | 10/2010 |
| WO | 2017046753 A1 | | 3/2017 |
| WO | 2018187329 A1 | | 10/2018 |
| WO | 2018215550 A1 | | 11/2018 |

* cited by examiner

PANEL SUITABLE FOR ASSEMBLING A FLOOR COVERING

CROSS REFERENCE TO RELATED APPLICATIONS

This application is a U.S. National Phase filing under 35 U.S.C. § 371 of International Application PCT/EP2020/050085, filed Jan. 3, 2020. PCT/EP2020/050085 claims priority from Netherland application number NL 2022368, filed Jan. 10, 2019. The entire contents of each of these applications are hereby expressly incorporated herein by reference.

FIELD OF THE INVENTION

The present invention relates to a panel suitable for assembling a floor covering by mounting a number of panels adjacent to each other on a substrate, wherein the panel has a substantially planar top side, and a substantially planar bottom side, at least four substantially linear side edges comprising at least one pair of opposite side edges, the panel having a layered structure which comprises a decorative top layer and an acoustical backing layer. The invention further relates to a floor or wall covering composed of panels are conform the invention.

BACKGROUND

Covering floors with panels is known in the art. Beside massive flooring panels made of wood, ceramic or stone, various types of laminate panels exist. These panels generally comprise a top layer with a certain look, for instance a wood imitation, and a core layer. These floors are either laid floating on a substrate, which may be a wooden, plywood, metal or concrete floor of a building, in this case the core often comprises coupling means for interconnecting multiple panels of the above mentioned type; or they are mounted directly on the substrate, in particular by gluing. On the basis of the composition of the decorative floor panel, these panels can be classified as a laminate (HDF-based), RCB (rigid core board), LVT (luxury vinyl tile), a WPC (wood plastic composite) etc. In general, these materials can be further categorized as lignocellulose-based flooring panels, mineral-based flooring panels, or thermoplastic-based flooring panels.

The present invention relates to a panel of the above described types, when they are mounted directly on the substrate, in particular by gluing. As is known in the prior art, for example described in CN102995877 and WO2018187329, it is possible to add to the decorative panel the added benefit of reducing footfall noise and sound transmission to the room below by addition of a padded backing layer to the bottom surface of the panel, by addition of a padded backing layer within the panel's construction itself, or both. In the industry, a moderate sound transmission result is one that is equal to or above Delta Lw 19 dB. An outstanding sound transmission will exhibit a sound transmission of Delta Lw 21 dB or above. A non-foamed, rigid thermoplastic based panel combined with a backing layer as described in WO '329 will typically have a result of around 16-17 dB Delta Lw.

WO2018187329 describes such a decorative top layer consists of or comprises a thermoplastic layer such as PVC, vinyl or LVT; or a hygroscopic wood veneer layer. The acoustical backing layer is described to include at least one padded layer and optionally a separate balancing layer as is known in the industry to be added to engineered wood flooring, laminates and the like. The actual acoustical padded layer is explained to consist of irradiation crosslinked polyethylene (IXPE), ethylene-vinyl acetate (EVA), woven and nonwoven thermoplastic fabrics, etc. In the industry, such flexible layers are commonly added on the back of a flooring product for increased acoustical performance and are therefore also generally called an "acoustical backing layer".

These acoustical backing layers generally exhibit a tensile strength of 0.2-1.4 Mpa when tested according to ASTM D412 depending on the density of the material used. When such a layer is provided and fixed between a floor panel and a substrate, it might become subject to stresses when one of the two layers to which it is adhered shows a fluctuation in dimension. For example, when a 1 mm sound-absorbing layer of ethylene-vinyl acetate or EVA is positioned between a 3 mm vinyl decorative layer and a concrete substrate, the vinyl decorative layer's dimensional instability under temperature fluctuations from 23 C-80 C results dimensional changes of 0.3% expansion at the high temperature, and 0.25% shrinking after cooling down again. This dimensional instability could cause gapping in actual installation, and an unacceptable visual defect as a result.

It has appeared in general that the materials selected for their specific benefits for manufacturing panels for assembling a floor covering, often lead to a decorative top layer having a certain dimensional instability when exposed to temperature and/or humidity fluctuations. When combined with an additional acoustical or reinforcing layer of low density and a certain flexibility, this will lead to visual defects when an installed flooring surface is subjected to cycles of fluctuating temperature or humidity.

DETAILED DESCRIPTION

The invention thereto proposes a panel suitable for assembling a floor covering by gluing a plurality of said panels onto a substrate, wherein the panel has a substantially planar top side, and a substantially planar bottom side, at least four substantially linear side edges comprising at least one pair of opposite side edges, the panel having a layered structure which comprises a decorative top layer, wherein the dimensional stability of the decorative top layer is dependent on temperature and/or humidity fluctuations; and in order to take away the disadvantages of the lower art, a lower density reinforcing layer, adhered to the top layer, having a tensile strength of at least 2 Mpa when tested according to ASTM D412.

The panel according to the invention is suitable for mounting on various substrates, and is less or not sensible to the dimensional stability of its own top layer and to the dimensional stability of the substrate or to the difference of the top layer and the substrate as a result of the specific properties of the reinforcing layer, in particular as a result of the material properties, more in particular as a result of the acoustic reinforcing layer. An additional advantage of the panel according to the invention is that it protects the substrate, in case of a fragile substrate, such as wood.

The top layer may for instance comprise a vinyl layer. A vinyl top layer is flexible but is as a result thereof unable to resist heavy objects or impacts. For example people wearing high heels with a small contact area will compress the substrate if that is for instance wood.

The material properties of the reinforcement layer according to the invention may also lead to improved acoustic properties of the floor, that is less scattering and reflection of sound, and a reduced impact sound and sound transmission to the room below.

The top layer of the panel according to the invention may alternatively comprise a paper or wood veneer top layer or a thermoplastic, lignocellulosic or thermosetting top layer.

The top layer may be composed of several levels which may comprise several materials or compositions, altogether showing a dimensional sensitivity to temperature and/or humidity fluctuations.

The invention herewith provides a, preferably sound absorbing, supporting layer that allows a certain absorption of the strength of impact to avoid indentation of the substrate, as well as improve the sound transmission to the room below, while preventing excessive deformation of the top layer due to an increased tensile strength. It has appeared that a tensile strength of less than 2 Mpa leads to a gap of more than 0.2 mm when performing the above described temperature test, and thus to a visible gap, while a tensile strength above 2 Mpa leads to a smaller and thus invisible gap.

A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of a core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics which could be used in such top layer are PP, PET, PVC and the like. It is also possible to provide on the top facing surface of the core an optional primer and print the desired visual effect in a direct printing process. The decorative top layer can receive a further finishing with a thermosetting varnish or lacquer such as polyurethane, PUR, or a melamine based resin.

It is also conceivable that the panel comprises (at its back surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET. The density of this acoustic layer preferably has a density between 65 kg/m3 and 300 kg/m3, most preferably between 80 kg/m3 and 150 kgm3.

The decorative top layer can comprise as primary components for example a mineral or ceramic compound with a thermoplastic or thermosetting binder, or a hygroscopic, lignocellulosic veneer and/or paper layer, or any other decorative top layer known in the industry that will exhibit a certain dimensional instability when exposed to fluctuations in temperature or humidity.

Below a non-exhaustive exemplary overview is given of materials suitable to create a decorative top layer of, together with their approximate dimensional stability when exposed to temperature and/or humidity fluctuations. It is the goal of this overview to indicate that the addition of flexible acoustic layers common in the industry between this top decorative layer and the substrate will lead to visual defects of the installed surface, if the top decorative layer shows a sensitivity to fluctuations in temperature and/or humidity.

| Material | Contents | Temperature ISO 23999 (80 C.-23 C.) | Temperature ISO 23999 (23 C.-60 C.) | Relative Humidity ISO 24339 (20%-80%) | Relative Humidity ISO 24339 (80%-20%) |
|---|---|---|---|---|---|
| Vinyl | 50% PVC, 30% limestone, 10% DOTP | −0.25% | 0.30% | — | — |
| Paper | 45% lignocellulose, 55% Thermosetting resin | 0.05% | −0.10% | 0.20% | −0.30% |
| Oak veneer (avg long./transv.) | 95% lignocellulose, 5% Polyurethane | 0.10% | −0.15% | 0.50% | −0.40% |
| Polypropylene | 50% polypropylene, 5% polyethylene, 45% chalk | −0.30% | 0.25% | — | — |
| SPC (high density PVC, 2000 kg/m3) | 30% PVC, 60% limestone, 10% DOTP | −0.20% | 0.15% | — | — |
| WPC (low density PVC, 950 kg/m3) | 50% PVC, 30% limestone, 10% DOTP | −0.50% | 0.40% | — | — |
| Polypropylene | | −0.20% | 0.15% | — | — |
| Ceramic composite | 50% MgO, 10% hydroxides, 40% salt | — | — | 0.10% | −0.10% |

The effect of installing these decorative top layers combined with a flexible acoustic layer further illustrates the defect inherent to the existing art. As an example, a vinyl top layer will show shrinking of −0.25% when tested according to ISO 23999, on a panel of 1.2 m length this will result in a transverse shrinking of 3 mm. Combined to a concrete substrate which shows no shrinking under temperature fluctuations, such as a ceramic material, and an acoustic layer in between, an actual flooring installation will become defective and show gaps of 3 mm in between each planks after only 5 heat/cold cycles.

It is the conclusion of the inventors that a panel produced according to the state of the art will cause visual defects in actual installation due to a difference in dimensional stability between the top decorative layer and the substrate, where the flexible acoustic layer interposed between this top layer and the substrate is not able to withstand the stresses created as a result of dimensional instability of the top layer.

These disadvantages are taken away by ensuring the acoustic layer is a reinforcing layer having a high modulus of elasticity or MOE and/or a high yield strength. This means in effect that the reinforcing layer is either not a flexible layer, or a flexible layer with a high MOE. For a ductile material this means the material will resist deformation until it reaches a certain point, and recovers from deformation easily without being showing plastic (lasting) deformation. For a brittle material this means it exhibits a strong resistance to plastic (lasting) deformation and breaking. Through extensive experimentation, the inventors have identified the following materials that exhibit the correct non-elastic properties. Some of these materials are low density materials that exhibit sound absorbing properties. It is of course understood that other materials with a similar or higher tensile strength will also be deemed suitable for use as a reinforcing acoustic layer.

| Material | Composition | Tensile strength ASTM D638 | Conclusion |
| --- | --- | --- | --- |
| 1 mm WPC 800 kg/m3 | 65% PVC, limestone, 2% plasticizer | 4.05 Mpa | Pass |
| 2 mm WPC 380 kg/m3 | 65% PVC, limestone, 10% plasticizer | 2.03 Mpa | Pass |
| 1 mm Foamed PP 100 kg/m3 | 100% Polypropylene | 2.88 Mpa | Pass |
| 1 mm PET 950 kg/m3 | 100% Polyethylene | 5.02 Mpa | Pass |

An additional advantage is that this buffer/reinforcing layer has a lower density than the top layer, and serves as buffer for impacts for both acoustic reasons, as for improvement of the impact resistance of the board.

The reinforcement layer can be applied with a glue, a hot melt material or by cold pressing after applying it at the bottom surface of the top layer. In some embodiments, it may also be added to the top decorative layer in a co-extrusion process, or applied to the top decorative layer as a liquid and subsequently foamed.

A panel, in accordance with one or more aspects of the present disclosure, that is suitable for assembling a floor covering by gluing a plurality of said panels onto a substrate includes a substantially planar top side, and a substantially planar bottom side. The panel also includes at least four substantially linear side edges which include at least one pair of opposite side edges. The panel has a layered structure which includes a decorative top layer. The decorative top layer shows a dimensional sensitivity to temperature and/or humidity fluctuations. The panel also includes a reinforcing layer, adhered to the top layer. The reinforcing layer has a modulus of elasticity of at least 2 Mpa.

In some embodiments of the panel the reinforcing layer is selected from the group of ductile materials with high modulus of elasticity and high yield strength, or brittle materials with high modulus of elasticity and high breaking strength, including but not limited to foamed olefin polymers, foamed PP, foamed PE, non-foamed PE, foamed polyurethane, carbon fiber, foamed PVC, polyurethane foam or expanded polystyrene.

In some embodiments of the panel, the reinforcing layer is a high-strength polymer foam.

In some embodiments of the panel, the reinforcement layer is between 0.5-3 mm thick.

In some embodiments of the panel, the reinforcing layer has a density lower than 1000 kg/m3.

In some embodiments of the panel, the reinforcing layer is applied with either a glue; a hot melt material; cold pressing after applying it at the bottom surface of the top layer; or applied as a liquid and foamed.

In some embodiments of the panel, the decorative top layer includes a mineral or ceramic compound with a thermoplastic or thermosetting binder, or a hygroscopic, lignocellulosic veneer and/or paper layer, or a stone veneer, or a ceramic tile or a mosaic.

In some embodiments of the panel, the decorative top layer is between 0.2-8 mm thick.

In some embodiments of the panel, the at least four substantially linear side edges (i.e., head ends) of the panel are flat.

In some embodiments of the panel, the at least four substantially linear side edges are without tongues or grooves.

In some embodiments of the panel, the at least four substantially linear side edges of the panel are angled at least 0.1 degrees.

In some embodiments of the panel, the panel further includes a core layer.

In some embodiments of the panel, the reinforcing layer has a density lower than 500 kg/m3.

In some embodiments of the panel, the reinforcing layer has a density between 85-300 kg/m3.

In some embodiments of the panel the at least four substantially linear side edges of the panel are angled more than 0.2 degrees.

The invention claimed is:

1. A panel suitable for assembling a floor covering by gluing a plurality of said panels onto a substrate,
   wherein the panel has a substantially planar top side, and a substantially planar bottom side, at least four substantially linear side edges comprising at least one pair of opposite side edges,
   the panel having a layered structure which comprises:
   a decorative top layer;
   wherein
   the decorative top layer shows a dimensional sensitivity to temperature and/or humidity fluctuations;
   characterized by
   a reinforcing layer, adhered to the top layer, and having a thickness in the range of 1.0 to 3 mm and a density between 85-300 kg/m$^3$,
   wherein said reinforcing layer has a modulus of elasticity of at least 2 Mpa, and a tensile strength in the range of 2.03 MPa-5.02 MPa.

2. A panel according to claim 1, wherein the reinforcing layer is selected from the group consisting of ductile materials with high modulus of elasticity and high yield strength, and brittle materials with high modulus of elasticity and high breaking strength.

3. A panel according to claim 1, wherein the reinforcing layer is a high-strength polymer foam.

4. A panel according to claim 1, wherein the reinforcing layer is applied with either a glue; a hot melt material; cold pressing after applying it at a bottom surface of the top layer; or applied as a liquid and foamed.

5. A panel according to claim 1, wherein the decorative top layer comprises a mineral or ceramic compound with a thermoplastic or thermosetting binder, or a hygroscopic, lignocellulosic veneer and/or paper layer, or a stone veneer, or a ceramic tile or a mosaic.

6. A panel according to claim 1, wherein the decorative top layer is 0.2-8 mm thick.

7. A panel according to claim 1, wherein the at least four substantially linear side edges of the panel are flat.

8. A panel according to claim 1, wherein the at least four substantially linear side edges of the panel are angled at least 0.1 degrees.

9. A panel according to claim 1, further comprising a core layer.

10. A panel according to claim 1, wherein the at least four substantially linear side edges of the panel are angled more than 0.2 degrees.

11. A panel according to claim 7, wherein the at least four substantially linear side edges of the panel are free from tongues or grooves.

12. The panel according to claim 1, wherein the reinforcing layer comprises at least one of foamed olefin polymers, foamed PP, foamed PE, non-foamed PE, foamed polyurethane, carbon fiber, foamed PVC, polyurethane foam, or expanded polystyrene.

* * * * *